United States Patent
Dewald et al.

(10) Patent No.: US 6,345,712 B1
(45) Date of Patent: Feb. 12, 2002

(54) AXLE ASSEMBLY WITH LIQUID COOLED BRAKE

(75) Inventors: Greg Dewald, Mooresville; Tony Dalton, Statesville, both of NC (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/590,695

(22) Filed: Jun. 9, 2000

(51) Int. Cl.[7] .................. F16H 57/04; F16D 65/853
(52) U.S. Cl. ............... 192/221; 188/71.6; 188/264 E; 475/160
(58) Field of Search .............. 192/221; 188/71.6, 188/264 E; 475/159, 160, 161, 220, 230

(56) References Cited

U.S. PATENT DOCUMENTS

| | | | |
|---|---|---|---|
| 1,380,584 A | * 6/1921 | Parker | 188/264 E |
| 1,866,252 A | 7/1932 | Dodge | |
| 2,348,499 A | 5/1944 | Sawtelle | |
| 2,571,432 A | 10/1951 | Farkas | |
| 4,113,067 A | * 9/1978 | Coons et al. | 188/71.6 |
| 4,468,981 A | * 9/1984 | Ries | 475/225 |
| 4,773,512 A | 9/1988 | Murakami | |
| 5,197,574 A | * 3/1993 | Al-Deen et al. | 188/71.6 |
| 5,407,036 A | 4/1995 | Hummel et al. | |
| 5,515,952 A | 5/1996 | Jackson | |

FOREIGN PATENT DOCUMENTS

JP 55-107132 A * 8/1980 ................ 188/71.6

* cited by examiner

*Primary Examiner*—Richard M. Lorence
(74) *Attorney, Agent, or Firm*—Liniak, Berenato, Longacre & White

(57) ABSTRACT

A differential axle assembly for providing differential torque transfer between an input shaft and two output shafts is disposed within a housing. Friction discs are splined to each of the output shafts. Reaction discs are splined to a stationery brake housing or trumpet casting in turn fixed relative to the differential housing. A piston or actuator selectively compresses the reaction plates to frictionally engage with the friction plates and apply a braking torque to the output shafts. Grooves are formed in the friction discs to cause lubricating oil to be thrown outward through the friction plates and enter oil cooling channels formed to divert the lubricating oil. The lubricating oil is preferably split off through two oil cooling channels. A first oil channel extends along the differential housing outward toward the wheel. A second oil channel extends inward toward the differential case. The lubricating oil absorbs heat as it flows through the brake. This heat is dissipated to the differential housing as it flows through the oil channels. The cooled lubricating oil is then returned to the inner area of the friction discs and the flow process is continuously repeated with rotation of the friction discs.

12 Claims, 2 Drawing Sheets ically rendered axle assembly according to the preferred embodiment of the present invention. An axle

AXLE ASSEMBLY WITH LIQUID COOLED BRAKE

BACKGROUND OF THE INVENTION

1. Field of the Invention

The present invention is directed to an axle assembly and is more particularly directed to a liquid cooled brake in an axle assembly.

2. Summary of the Prior Art

In a differential axle assembly the differential is provided with a pair of side journals which are rotatably supported by a pair of spaced bearing and bearing caps carried on the transaxle differential housing. A pair of axle shafts extend outwardly from the differential unit through the bearings and bearing caps. In heavy duty differential assemblies a brake may be provided to brake at least one of the axle shafts. In some arrangements at least one friction disc is splined to each axle shaft. A brake assembly selectively compresses reaction plates which are splined to the axle tube. Compression of the reaction plates causes the reaction plates to frictionally engage the friction discs and consequently apply braking torque thereto. Activation of the brake generates substantial thermal energy which is absorbed by adjacent components which may shorten the useful life of the friction discs and can cause premature failure.

It is an object of the present invention to provide a differential axle assembly with a brake arrangement disposed within the housing that overcomes the drawbacks of the prior art and provides enhanced cooling of lubricating oil flowing there through.

SUMMARY OF THE INVENTION

A differential axle assembly for providing differential torque transfer between an input shaft and two output shafts is disposed within a housing. A plurality of spaced apart friction discs are splined to each of the output shafts. A plurality of reaction discs are splined to a stationery brake housing or trumpet casting in turn fixed relative to the differential housing. A piston or actuator selectively compresses the reaction plates to frictionally engage with the friction plates and apply a braking torque to the output shafts. Grooves are formed in the friction discs to cause lubricating oil to be thrown outward through the friction plates and enter oil channels formed to divert the lubricating oil. The lubricating oil is preferably split off through two oil channels. A first oil channel is formed between the trumpet casting and housing and extends along the differential housing outward toward the wheel end to the exterior of the trumpet casting. A second oil channel extends inward toward the differential case. The lubricating oil absorbs heat as it flows through the brake. This heat is dissipated to the differential housing as it flows through the oil channels. The cooled lubricating oil is then returned to the inner area of the friction discs and the flow process is continuously repeated with rotation of the friction discs. A cored channel is formed on the piston bore to provide a washing action to prevent contaminants from settling into a sealed interface between the piston and piston bore.

DESCRIPTION OF THE PREFERRED EMBODIMENT

Figure 1:
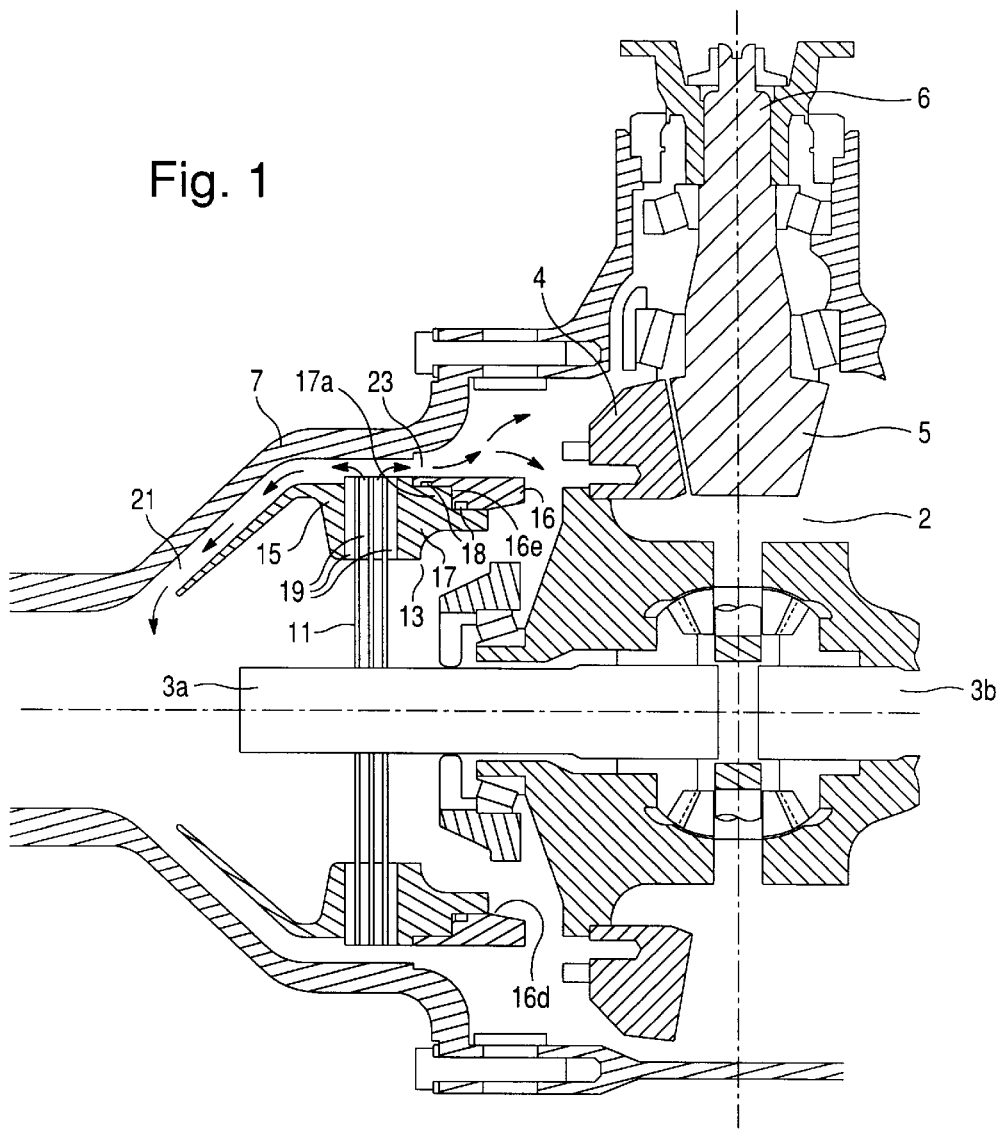
FIG. 1 is a cross sectional view of an axle assembly with the liquid cooled brake according to the present invention.

FIG. 1 depicts a differential axle assembly according to the preferred embodiment of the present invention. An axle housing 1 contains a differential gear assembly 2 for facilitating differential torque transfer between a pair of output shafts 3a, 3b. As is well known in the art, a ring 4 gear engages a pinion gear 5 of an input shaft 6. The ring gear 4 is secured to the differential case containing the remaining components of the differential gear assembly. The output shafts 3a, 3b emerge from the differential case extending outward toward an associated wheel end. As the drive shaft 6 and pinion gear 5 are rotated, the differential gear assembly transfers torque to the output shafts 3a, 3b and allows for differential rotational speed between the output shafts 3a, 3b. The operation of the differential assembly is well known in the art.

In heavy duty off road vehicles, it is desirable to provide a brake in the axle assembly. A plurality of friction discs 11 are splined to each output shaft (One shown) and extend radially outward toward the housing 1. A brake assembly 13 is provided to apply braking torque to the friction discs 11. A trumpet casting 15 is fixed relative to the housing 1, as is a piston bore 16. A plurality of reaction discs 19 are provided on either side of each of the friction discs 11 and are splined to the trumpet casting 15. A piston 17 is disposed between the piston bore 16 and the reaction discs 19. Hydraulic fluid is applied through the piston bore 16 to displace the piston 17 thereby compressing the reaction discs 19 in turn applying the braking torque to the friction plates 11 as is known in the art the details of which will not be embellished. Consequently, the output shaft 3a is braked or locked if sufficient force is applied. In the preferred embodiment the piston 17 is stepped 17a to engage a step portion 16a of the piston bore 16. A pair of seals 18 provides a sealed interface between the piston 17 and piston bore 16.

Application of the brake assembly 13 generates a substantial amount of heat. The friction 11 and reaction 19 discs absorb the kinetic energy of the vehicle during braking which is then converted into heat. This large amount of heat is consequently absorbed by the surrounding components resulting in a significant rise in temperature. The large amount of heat and temperature causes the friction discs 11 and reaction discs 19 to wear prematurely and may cause surrounding components to fail. Therefore, cooling channels are provided to continuously cool the brake assembly 13.

The friction discs 11 are provided with grooves (not shown) on at least one side thereof. The friction discs 11 are in contact with lubricating oil contained within the housing 1. As the friction discs 11 are rotated, lubricating oil is forced radially outward through the brake 13 assembly and between the reaction discs 19. A first oil cooling channel 21 is formed between the trumpet 15 casting and the housing 1 and extends substantially along the housing 1 outward toward the wheel end. A second oil cooling channel 23 extends inward toward the differential case and is formed between said piston bore 16 and the housing 1. A positive clearance 16F is provided between the piston 17 and housing to inhibit the deposit of contaminants within the second oil cooling channel 23. The significant length of the first oil cooling channel 21 enhances heat transfer to the housing 1 which in turn dissipates heat to the atmosphere. The result is a substantial reduction in the temperature of the brake assembly 13 and the lubricating oil. The bifurcation of the oil cooling channel to two channels coupled with the significant length of the channels utilizes a significantly larger amount of lubricating oil circulating through the brake assembly 13. Moreover, the increased contact area along the length of the oil cooling channels provides increased heat transfer and conduction to portions of the housing 1 further away from the brake assembly 13 having a lower temperature. The combined effect is the substantial reduction in temperature of the brake assembly 13, friction discs 11 and lubricating oil. Thus performance and life of the parts of the assembly are enhanced.

Once the lubricating oil is forced through the oil cooling channels 21/23, the lubricating oil is allowed to return to a sump portion of the housing 1. (Not Shown) The friction discs 11 are in contact with the lubricating oil and as the friction discs 11 rotate, the lubricating oil is again forced through the brake assembly 13. So long as the friction discs 11 continue to rotate the flow of lubricating oil is continuously forced through the brake assembly 13 and returned to the sump.

Figure 3A:
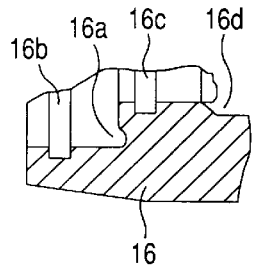
FIG. 3A is an enlarged isolated partial sectional view of the piston bore of the brake assembly of the embodiment shown in FIG. 1.
Figure 3B:
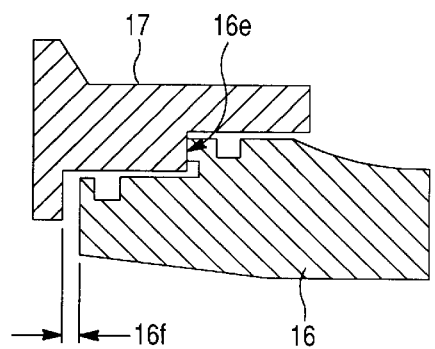
FIG. 3b is an enlarged isolated sectional view of the piston and piston bore of the brake assembly of the embodiment shown in FIG. 1.

FIGS. 3A & 3B are enlarged partial section view of the piston 17 and piston bore 16 of FIG. 1. Note the annular recesses 16b/16c which accommodate annular seals 18 defining the seal interface with the piston 17. More significantly, the piston bore 16 is provided with a cored channel 16d formed on a radially inner surface adjacent the piston 16. The cored channel 16d prevents contaminants or other debris contained in the lubricating oil from reaching the back end of the piston 17 and piston seal interface as well as the friction discs 11. Thus, as the friction discs 11 continue to rotate and force the flow of oil through the brake assembly 13, the cored channel 16d provides a washing action to eliminate the possibility of debris becoming entrapped in the brake piston bore and seal area. Also shown in FIGS. 3A & 3B there is a positive piston stop shoulder 16E that serves to provide a positive abutment to stop the piston back travel. This serves two purposes: A) to provide positive running clearance in the brake; and B) to insure that no contamination can interfere with the proper function and clearance of the brake assembly. Also shown in FIGS. 3A & 3B is an undercut 16A in the face of the shoulder 16E. This undercut 16A acts like a hydraulic conduit that is annular and serves to apply even force to actuate the piston 17.

Figure 2:
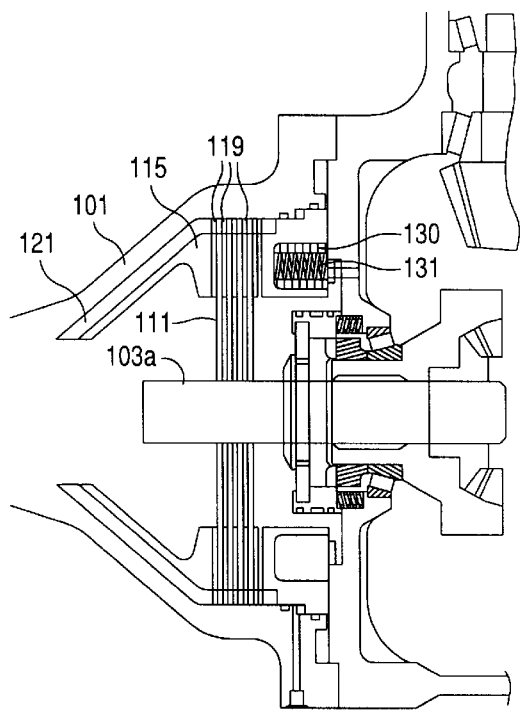
FIG. 2 is across sectional view of an axle assembly and liquid cooled brake according to an alternate embodiment of the present invention.

FIG. 2 is directed to an alternate embodiment of the present invention. As in the first embodiment the axle assembly is provided with a housing 101 and differential gear assembly for provided differential torque to and between a pair of output shafts 103 (One shown). A plurality of friction discs 111 are splined to the output shafts 103 and extend toward the housing 101. A brake assembly applies a braking force to the friction discs 111 by compressing a plurality of reaction discs 119 much like in the previous embodiment. However, the brake assembly includes a spring 130 to bias the reaction discs 119 to compress and brake or lock the friction discs 111. Hydraulic fluid is selectively supplied to a piston to overcome the biasing action of the spring 130 to allow the friction discs 111 to rotate. The output shafts 103 are locked in the inactive state. A single oil cooling channel 121 is formed between the trumpet casting 115 and the housing 101 and extends substantially along the housing 101 outward toward the wheel ends. The lubricating oil absorbs heat as is passes through the brake assembly and through the reaction discs 119. The heated lubricating oil flows along the oil cooling channel 121 where heat is absorbed by the housing 101 and in turn dissipated to the external atmosphere. The lubricated oil is then allowed to freely flow to a sump in the differential housing 101 where the process is continuously repeated as the friction discs 111 rotate.

Figure 4:
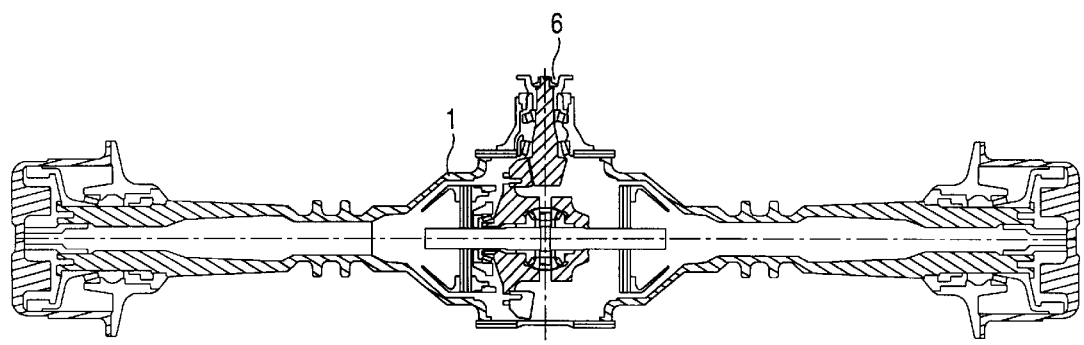
FIG. 4 is a section of the axle assembly of FIG. 1 incorporating an entire wheel end assembly.

FIG. 4 depicts the differential axle assembly of FIG. 1 incorporated into an entire wheel end axle assembly. Torque is transmitted to each wheel from the drive shaft 6 via the differential gear assembly. As is clearly demonstrated, the braking of the output shafts 103a, 103b substitutes or can supplement the braking of the wheels.

While the foregoing invention has been shown and described with reference to a preferred embodiment, it will be understood by those possessing skill in the art that various changes and modifications may be made without departing from the spirit and scope of the invention.

What is claimed is:

1. An axle assembly comprising:
   a housing containing a lubricating oil, a differential gear assembly and a pair of axle shafts extending laterally outwardly in opposite directions from the housing toward an associated wheel end, said differential gear assembly allowing differential speed rotation of said output shafts;
   at least one friction disc splined to one of said output shafts extending radially therefrom, said friction discs being in partial contact with said lubricating oil;
   a brake assembly secured to said housing and including reaction discs disposed on either side of said at least one friction disc provided to frictionally engage said at least one friction disc to apply a braking force thereto; and
   at least one oil cooling channel extending from said brake assembly substantially along said housing wherein when said friction discs are rotated said lubricated oil is radially thrown outward between said at least one friction disc and said reaction discs and forced through said at least one oil cooling channel;
   wherein said at least one oil cooling channel comprises a first oil cooling channel extending outward toward one of said associated wheel ends and defined by a space between said housing and a trumpet casting disposed adjacent said reaction discs and disposed opposite said differential gear assembly, said lubricating oil being forced through said first oil cooling channel as said at least one friction disc is rotated.

2. The axle assembly according to claim 1, wherein said at least one oil cooling channel further comprises a second oil cooling channel extending inward toward said differential gear assembly, said lubricating oil splitting off into said first and second oil cooling channels as said at least one friction disc is rotated.

3. The axle assembly according to claim 1, wherein said at least one friction disc includes a plurality of friction discs having a reaction disc disposed on either side thereof.

4. An axle assembly comprising:
   a housing containing a lubricating oil, a differential gear assembly and a pair of axle shafts extending laterally outwardly in opposite directions from the housing toward an associated wheel end, said differential gear assembly allowing differential speed rotation of said output shafts;

at least one friction disc splined to one of said output shafts extending radially therefrom, said friction discs being in partial contact with said lubricating oil;

a brake assembly secured to said housing and including reaction discs disposed on either side of said at least one friction disc provided to frictionally engage said at least one friction disc to apply a braking force thereto; and at least one oil cooling channel extending from said brake assembly substantially along said housing wherein when said friction discs are rotated said lubricated oil is radially thrown outward between said at least one friction disc and said reaction discs and forced through said at least one oil cooling channel;

wherein said at least one oil cooling channel comprises a first oil cooling channel and a second oil cooling channel, said first oil cooling channel extending outward toward one of said associated wheel ends and said second oil cooling channel extends inward toward said differential gear assembly, said lubricating oil splitting off into said first and second oil cooling channels as said at least one friction disc is rotated; and wherein said brake assembly further includes;

a trumpet casting and a piston bore disposed on either side of said reaction plates and fixed relative to said housing;

a piston disposed between said piston bore and said reaction plates, whereupon hydraulic pressure is selectively applied to said piston to selectively displace said piston to compress said reaction discs and thereby apply said braking force to said at least one friction disc; wherein said piston bore and said piston are disposed inward of said reaction discs adjacent said differential assembly and said trumpet is disposed on an opposite side of said reaction discs, said first cooling channel formed between said trumpet casting and said housing and said second oil cooling channel formed between said piston bore and said housing.

5. The axle assembly according to claim 4, wherein said piston bore has a cored channel formed on a radial inward side thereof adjacent said piston, said cored channel being provided to prevent contaminants from reaching a sealed interface between said piston and said piston bore.

6. The axle assembly according to claim 4, wherein said piston bore further comprises:

a positive piston stop shoulder interposed between a pair of seals provided to engage said piston and to control a running clearance of said piston and prevent contamination from affecting brake function.

7. The axle assembly according to claim 4, wherein a positive clearance is provided between said piston and said housing to prevent the deposit of oil contaminants.

8. The axle assembly according to claim 4, wherein said piston bore further comprises an annular hydraulic fluid conduit adjacent a piston chamber to allow even pressure and force application to said piston.

9. The axle assembly according to claim 4, wherein old said piston bore has a hydraulic fluid conduit formed therein for delivering hydraulic fluid to said piston.

10. The axle assembly according to claim 4, wherein each of said plurality of friction discs contain at least one radially extending grooved formed on a surface thereof to facilitate the force of said lubricating oil radially outward between said friction disc and said reaction discs through said oil distribution channel as said friction disc is rotated.

11. The axle assembly according to claim 5, wherein said piston is stepped engaging a stepped portion of said piston bore and said sealed interface includes a pair of seals disposed between said piston and said piston bore.

12. An axle assembly comprising:

a housing containing a lubricating oil, a differential gear assembly and a pair of axle shafts extending laterally outwardly in opposite directions from the housing toward an associated wheel end, said differential gear assembly allowing differential speed rotation of said output shafts;

a plurality of friction discs splined to one of said output shafts extending radially therefrom, said friction discs being in partial contact with said lubricating oil;

a brake assembly secured to said housing and including reaction discs disposed on either side and between said plurality of friction discs provided to frictionally engage said at least one friction disc to apply a braking force thereto, said brake assembly including, a trumpet casting and a piston bore disposed on either side of said reaction plates and fixed relative to said housing;

a piston disposed between said piston bore and said reaction plates, whereupon hydraulic pressure is selectively applied to said piston to selectively displace said piston to compress said reaction discs and thereby apply said braking force to said at least one friction disc, wherein said piston bore and said piston are disposed inward of said reaction discs adjacent said differential assembly and said trumpet is disposed on an opposite side of said reaction discs; and a first oil cooling channel and a second oil cooling channel, said first oil cooling channel formed between said trumpet casting and said housing and extending substantially long said housing and outward toward one of said associated wheel ends and said second oil cooling channel being formed between said piston bore and said housing extending inward toward said differential gear assembly, wherein when said friction discs are rotated said lubricating oil is radially thrown outward and forced through reaction discs, said lubricating oil splitting off into said first and second oil cooling channels, wherein said piston bore has a cored channel formed on a radial inward side thereof adjacent said piston, said cored channel being provided to prevent contaminants from reaching a sealed interface between said piston and said piston bore.

* * * * *